(12) United States Patent
Remillard et al.

(10) Patent No.: US 8,291,684 B2
(45) Date of Patent: Oct. 23, 2012

(54) SWATHER WITH AUTOMATIC REEL CONTROL

(75) Inventors: Rheal G. Remillard, St. Joseph (CA); James Thomas Dunn, Winnipeg (CA); Don MacGregor, Winnipeg (CA); Brent Gabriel, Winnipeg (CA); Leonard Bergman, Winnipeg (CA)

(73) Assignee: MacDon Industries Ltd., Winnipeg, MB (CA)

( * ) Notice: Subject to any disclaimer, the term of this patent is extended or adjusted under 35 U.S.C. 154(b) by 0 days.

(21) Appl. No.: 13/084,638

(22) Filed: Apr. 12, 2011

(65) Prior Publication Data
US 2011/0239605 A1 Oct. 6, 2011

Related U.S. Application Data

(62) Division of application No. 11/116,417, filed on Apr. 28, 2005, now Pat. No. 7,958,706.

(60) Provisional application No. 60/663,762, filed on Mar. 22, 2005.

(51) Int. Cl.
*A01D 41/127* (2006.01)

(52) U.S. Cl. .................. 56/10.2 R; 56/17.1; 56/221

(58) Field of Classification Search .............. 56/10.2 J, 56/10.2 R, 10.8, 11.1, 16.4 R, 192, 10.2 E, 56/10.2 A, 13.5, 14.3, 14.4, 14.9–15.2, 15.9–16.2, 56/17.1, 121.46, 208, 210, 212–214, 217, 56/219–222, 226–228, 364; 700/83; 172/1, 172/2, 3

See application file for complete search history.

(56) References Cited

U.S. PATENT DOCUMENTS

| | | | |
|---|---|---|---|
| 3,466,854 A | 9/1969 | Ashton et al. |
| 3,906,710 A | 9/1975 | Pask |
| 4,126,987 A | 11/1978 | Sarich |
| 4,458,471 A | 7/1984 | Herwig |
| 4,513,562 A | 4/1985 | Strubbe |
| 4,518,043 A | 5/1985 | Anderson et al. |
| 4,967,544 A | 11/1990 | Ziegler et al. |
| 5,743,073 A | 4/1998 | Paquet |
| 6,119,442 A | 9/2000 | Hale |
| 6,148,593 A | 11/2000 | Heinsey et al. |
| 6,167,685 B1 | 1/2001 | Berger et al. |
| 6,343,237 B1 | 1/2002 | Rossow et al. |
| 6,381,932 B1 | 5/2002 | Clauss |
| 6,651,411 B1 | 11/2003 | Becker et al. |
| 6,726,559 B2 | 4/2004 | Bischoff |
| 2003/0110749 A1 | 6/2003 | Frego |

*Primary Examiner* — Jamie L McGowan
(74) *Attorney, Agent, or Firm* — Adrian D. Battison; Ade & Company Inc.

(57) ABSTRACT

In a swather formed by a tractor and attached heeder for cutting standing crop to form a swath, reel speed and optionally draper speed are controlled relative to ground speed by a control system including a manually operable input and display available to the operator. The control system can be used in an automatic mode to set an index value for an actual difference in reel speed relative to ground speed and to vary reel speed accordingly. In this mode a manually operable control varies the index. The control system can be switched by the operator to manual in which case the same control varies the actual reel speed. Minimum reel speed can be set by the same control and when operative the automatic system does not allow reel speed to fall below the minimum set value despite the values of index and ground speed. A crop-lodged switch is also provided which when operated acts to move the header to a lowered position and the move the reel to a forward most and lowermost position in a single operation controlled by the single switch.

2 Claims, 3 Drawing Sheets

SWATHER WITH AUTOMATIC REEL CONTROL

This application is a divisional application of application Ser. No. 11/116,417 FILED Apr. 28, 2005 and now issued as U.S. Pat. No. 7,958,706.

This application claims priority under 35 U.S.C.119 from provisional application Ser. No. 60/663,762 filed Mar. 22, 2005.

This application is related to application Ser. No. 11/116,418 filed simultaneously with this application by the same assignee and now issued as U.S. Pat. No. 7,159,687, the disclosure of which is incorporated herein by reference.

This invention relates to a swather with an operator controlled system for maintaining reel operation.

BACKGROUND OF THE INVENTION

Reels are used on crop harvesting machines, like windrowers and combines, to lift crop that is down & lodged so the cutting mechanism has good access to the plant (not leaving any seeds or desirable plant material behind) and to push the crop into the header for conveying to the windrow discharge.

For maximum efficiency (effectively raise the plants, minimize seed shatter, minimize wear on mechanical parts & minimize power required to drive the reel), it is desirable that the reel run at the right speed and that the operator have full control of the reel speed for all crop and ground speed conditions.

In addition the height and location of the reel should be readily adjustable under simple operator control so that the reel can be moved quickly and simply to the optimum position for crop condition.

Reel speed controlled relative to vehicle ground speed has been used on combines for some time to assist the operator to obtain the right speed without excessive input from the operator (which causes fatigue). We believe this is the first application of an electrically controlled, hydraulically driven reel speed relative to ground speed on a windrower.

Case AFX combine—A rocker switch 'A' turns the relative speed feature on/off. When relative speed is off, a rotary switch 'B' is used to control the reel speed. When 'A' is on, switch 'B' controls the index. To set the minimum speed you have to go into the computer menu to set the minimum reel speed. It is believed that the reel does not have a speed sensor and that the computer knows the reel speed from the relative position of the hydraulic valve that controls the reel speed. The header jack-shaft that runs the mechanical drives on the header has a similar relative speed feature.

Case 2388 combine—Works the same as above, except that the minimum reel speed is the last reel speed setting in the manual mode before turning on the relative speed feature.

John Deere combine—A monitor switch 'A' on the post turns the relative speed feature on/off. When relative speed is off, a rocker switch 'B' is used to control the reel speed. When 'A' is on, switch 'B' controls the index. The minimum reel speed is the last reel speed setting in the manual mode before turning on the relative speed feature. When a pickup header is used, the drives on the header have a similar relative speed feature.

SUMMARY OF THE INVENTION

It is one object of the invention to provide a swather with an operator controlled system for maintaining reel speed at a set index value relative to ground speed.

According to a first aspect of the present invention there is provided a swather comprising:

a tractor having ground wheels and a drive system for transporting the tractor in a direction of operation across ground carrying a standing crop to be harvested;

a header attached to the tractor so as to be moved thereby over the ground for harvesting the crop;

the header having a cutting knife arranged to provide a cutting action across a width of the header for cutting the standing crop;

the header having a reel mounted above the cutting knife for rotation about a reel axis generally parallel to the ground and at right angles to the direction of operation such that bats of the reel pass over the cutting knife to carry the crop rearwardly of the knife, the reel being driven by a reel drive system;

a convergence system rearwardly of the cutting knife for converging the cut crop into a swath for discharge from the header onto the ground;

a speed control manually operable by an operator of the tractor for controlling a ground speed of the tractor so as to control a forwarding speed of the cutting knife over the ground;

a header speed control system for controlling a speed of the reel;

a header lift actuator for raising and lowering the header relative to the tractor;

a reel lift actuator for raising and lowering the reel relative to the cutting knife;

a reel location actuator for locating the fore and aft position of the reel relative to the cutting knife;

and a header position control system for controlling the position of the header relative to the tractor and the reel relative to the header switch, the header position control system including:

a first manually operable control switch operable by the operator for manually controlling the header lift actuator so as to move the header to a required position set by the operator;

a second manually operable control switch operable by the operator for manually controlling the reel lift actuator so as to move the reel to a required height position set by the operator;

a third manually operable control switch operable by the operator for manually controlling the reel location actuator so as to move the reel to a required fore and aft position set by the operator;

and a crop-lodged switch operable by the operator;

the crop-lodged switch being arranged when operated by the operator to carry out at least each of the following three functions:

to actuate the header lift actuator to move the header, without the operator operating the first manually operable control switch, from the required position of the header to a predetermined lowered position in which the cutting knife is close to the ground;

to actuate the reel lift actuator to move the reel, without the operator operating the second manually operable control switch, from the required height position of the reel to a lowermost position of the reel;

and to actuate the reel location actuator to move the reel, without the operator operating the third manually operable control switch, from the required fore and aft position of the reel to a forwardmost position of the reel.

Preferably the first, second and third switches and the crop-lodged switch are arranged such that the header and reel are returned to an operating position after operation of the crop-lodged switch by manual operation of the first, second and third switches.

The term "standing crop" used herein is intended to include crops which have become lodged or lying due to weather conditions or otherwise and thus to be directed to any uncut crop.

The term "cutting knife" as used herein is not intended to be limited to any particular arrangement of cutting system and many different systems are available to one skilled in the art.

The term "convergence system" as used herein is not intended to be limited to any particular arrangement of convergence system and many different systems are available to one skilled in the art. The present invention is particularly applicable to draper systems which provide a draper speed control system. However it can also be used in auger systems or other convergence systems which simply use converging guide plates.

This invention pertains primarily to controlling the speed of the reel but can include other mechanisms, such as the conveyor in this case. When setting up the machine, it can be programmed to index just the reel or both the reel & conveyor.

The peripheral reel speed is monitored and displayed in mph or km/hr, e.g. "5.85 REEL mph". For some headers an additional choice is given to display reel speed in rpm. Also indicated is the index value of reel speed relative to ground speed, if this option is activated, e.g. "5.85 1.35 REEL" where 1.35 is the index (ground speed in this case is 5.85−1.35=4.5 mph).

When the relative speed is activated on combines there are some shortcomings. They use a multiplier of ground speed to determine the reel speed. Thus, if the setting is at 1.5× mph, then at a ground speed of 2 mph the reel has a peripheral speed of 3 mph and at 6 mph has a reel speed of 9 mph. A reference reel speed is usually set in lodged crop when vehicle ground speed is slow and the reel speed is most critical. When the combine gets back into standing crop the ground speed can be increased, which results in too fast a reel speed which shatters crop, uses excessive power to drive the reel & prematurely wears components.

The design shown herein indexes the reel speed so that the index amount does not change with ground speed. Thus, for example, if the index is set at 1 mph, then at a ground speed of 2 mph the reel has a peripheral speed of 3 mph (same as above) and at 6 mph has a reel speed of 7 mph (2 mph less that a multiplier example above). The index amount can be adjusted.

In addition, in combines the system has a complicated interface. It usually requires three or four switches; a first switch to turn the relative speed on/off, a second switch to control the speed when the feature is turned off, a third switch to control the relative speed when the feature is on and a fourth switch to control the minimum speed).

The design shown herein uses two switches, one to turn the feature on/off and another to control all the other functions as described below.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
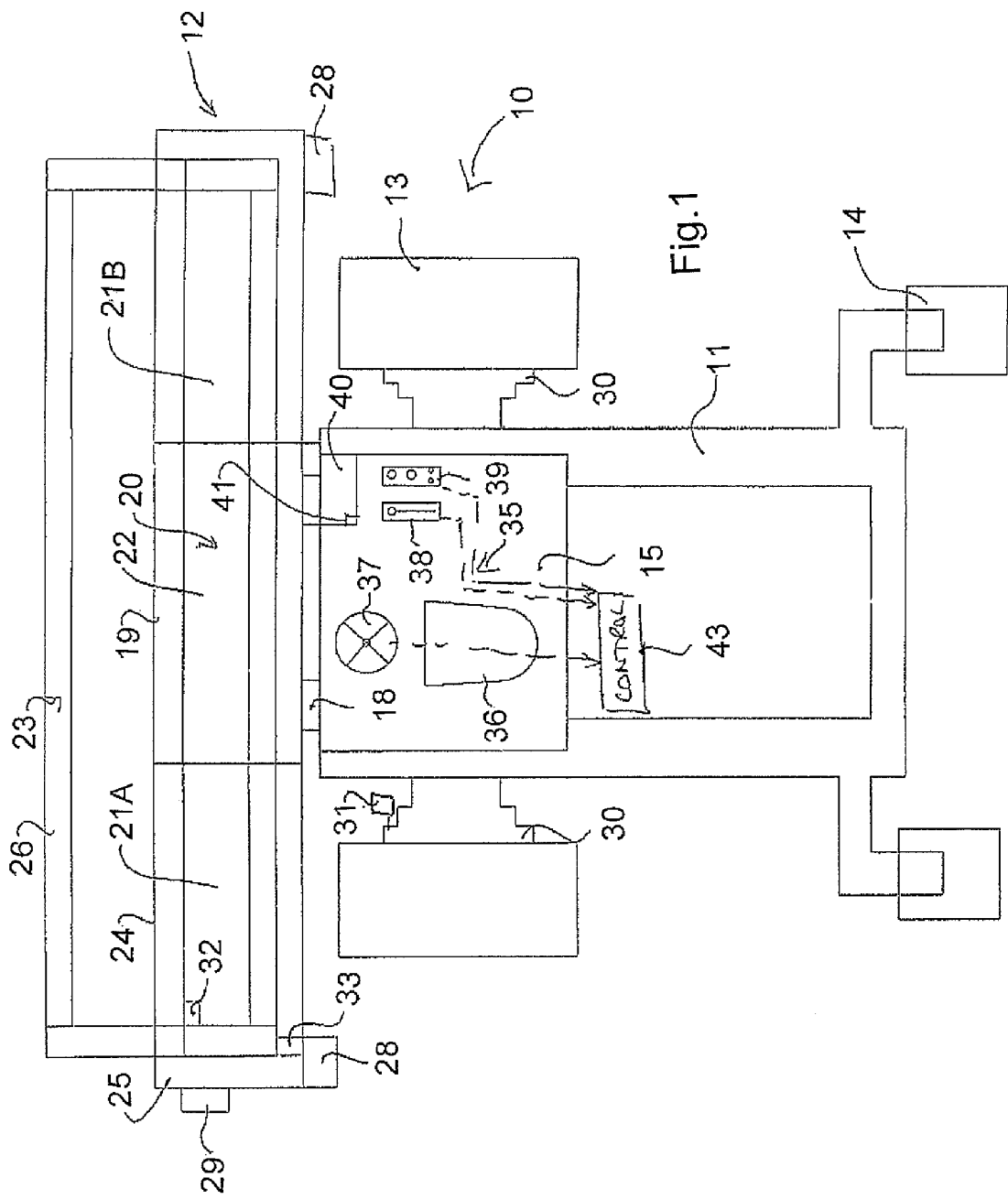
FIG. 1 is a schematic plan view of a swather according to the present invention.
Figure 2:
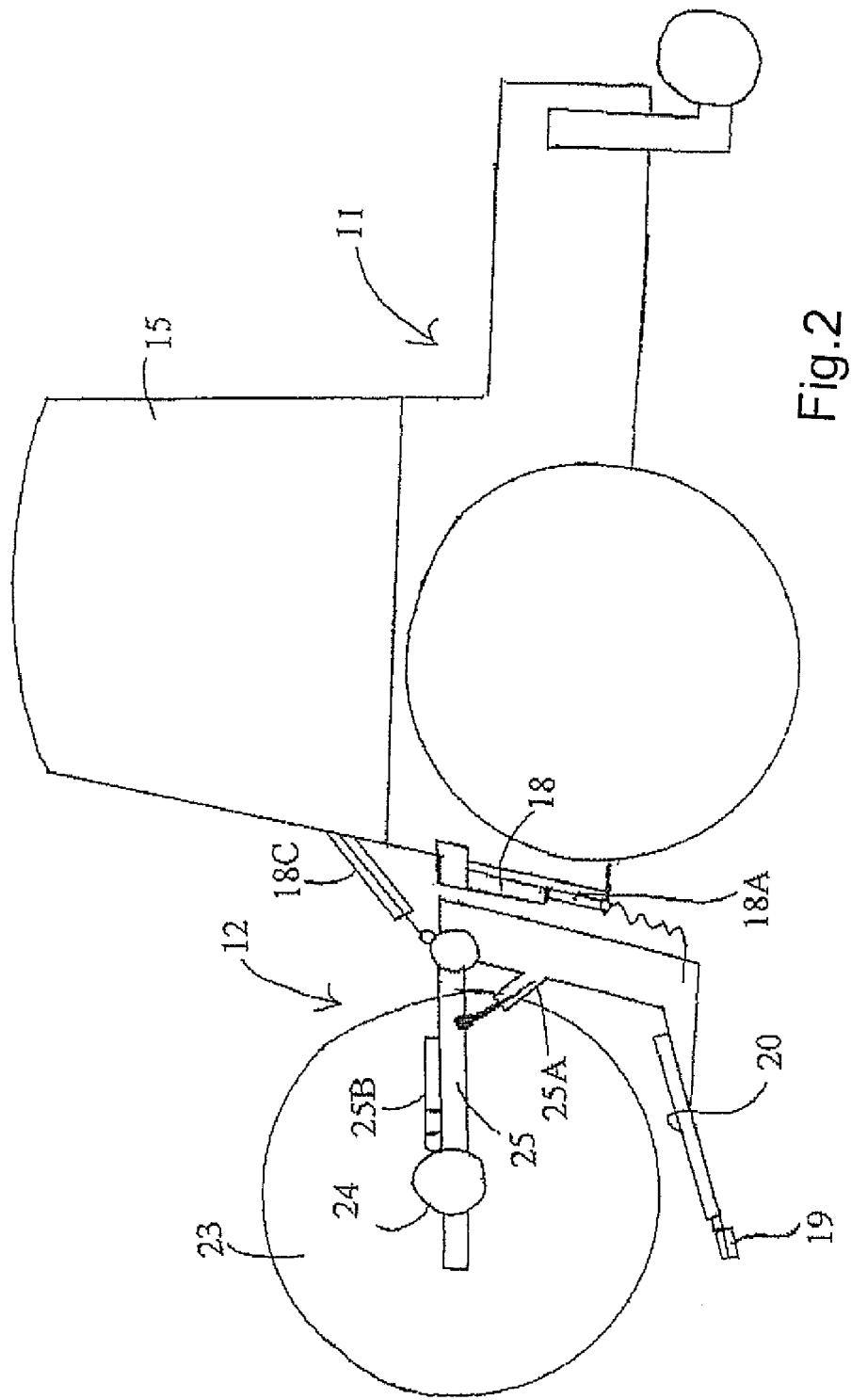
FIG. 2 is a schematic side elevational view of the swather of FIG. 1.

In FIG. 1 is shown a swather generally indicated at 10 which includes a tractor 11 and a header 12. The swather tractor is preferably of the type which includes driven front wheels 13 and trailing rear castor wheels 14 with a cab 15 over the front wheels and an engine and drive arrangement 16 at the rear wheels. The tractor includes header support members 18 at the forward end which mount the header in front of the tractor for movement across the ground for cutting standing crop.

The header support members are shown only schematically but generally include a pair of side arms 18A and 18B each adjacent a respective wheel of the tractor and extending forwardly to a respective location on the header. The arm height can be adjusted to raise and lower the header at that position. An adjustable central link 18C extends forwardly from the center of the tractor to the top of the header so as to pivot the header forwardly and rearwardly about a transverse axis at the support at the arms 18A and 18B. Such adjustments are conventional and well known to a person skilled in this art. They are shown only schematically since different designs of the specific links are available.

The header includes a front cutting knife 19 at the front edge of a table 20 at which is located a converging system which, in the example shown, is a pair of drapers 21A and 21B which carry the cut crop inwardly from ends of the header toward a central opening area 22 at which the swath is formed and deposited in the area underneath the tractor. On the head is mounted a reel 23 which has a central support 24 carried on a pair of arms 25 with radially extending members which support longitudinally extending bats 26 which rotate around the axis defined by the support 24.

The position of the reel relative to the header can be adjusted in height by raising and lowering the arms 25 by a cylinder 25A on each side and in fore and aft location along the arms by a cylinder 25B on each side. Such adjustments are conventional and well known to a person skilled in this art. They are shown only schematically since different designs of the specific links are available.

The converging system of the header is driven by a motor schematically indicated at 28 which may be provided by a common motor and mechanical linkage or by a pair of motors as shown, one motor for each draper. The reel is driven by a motor schematically indicated at 29. The ground wheels are each driven by a motor schematically indicated at 30. A sensor 31 detects ground speed. A sensor 32 detects reel speed. A sensor 33 may be provided to detect conveyor speed or alternatively a sensor may be omitted here because less precision is required in the case of the conveyors as opposed to the reel speed. For the conveyor the system can use the relative value of the control signals for control purposes.

Within the cab 15 is mounted a operator console generally indicated at 35 which includes a seat 36, a steering arrangement 37, a speed control 38 and an implement control system 39. In front of the operator is provided a display 40 which includes at least one switch 41. All of the elements concerned including the speed of the various motors, the inputs from the sensors and the inputs from the control elements are supplied to a control system schematically indicated at 43.

Figure 3:
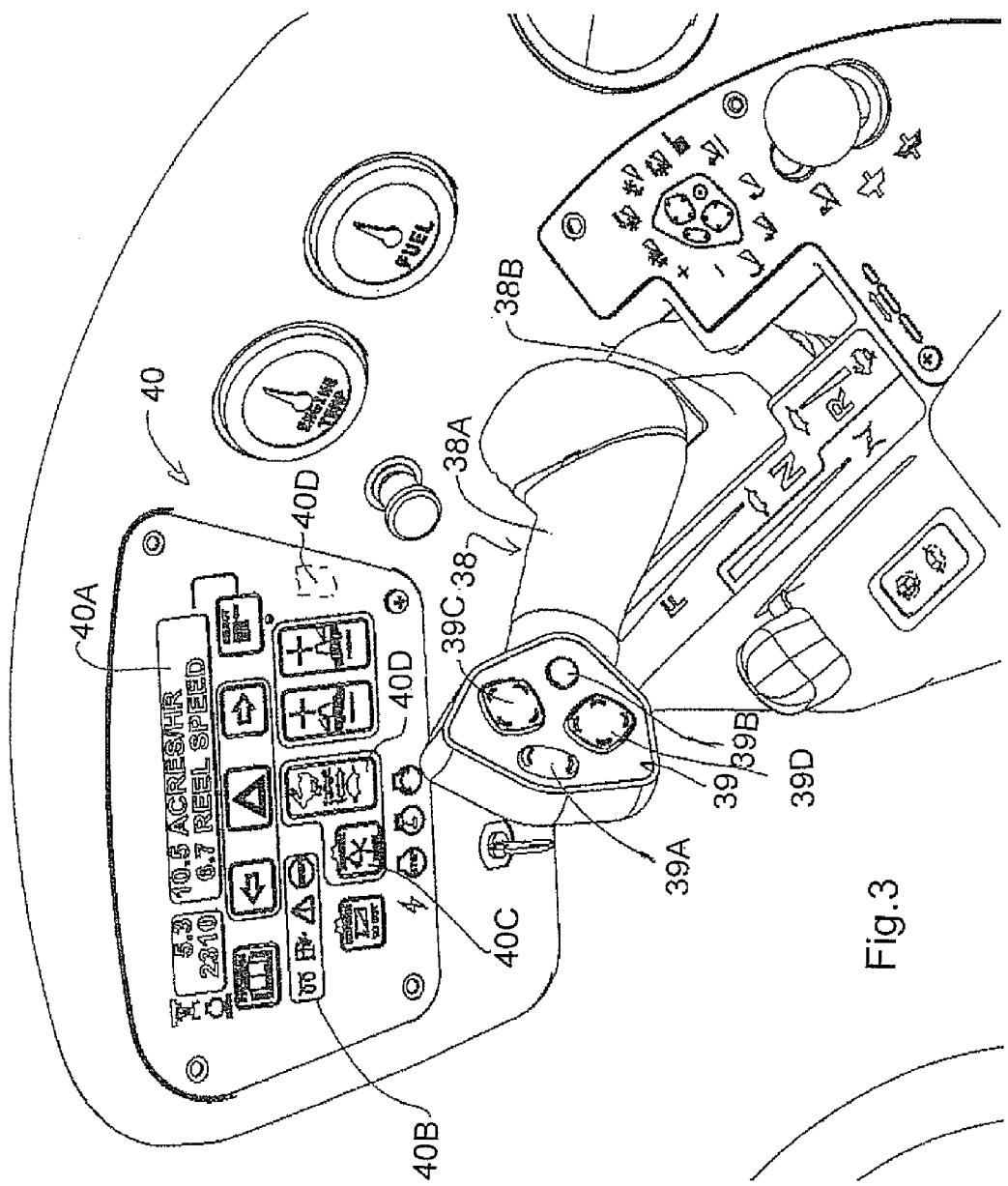
FIG. 3 is a plan view on an enlarged scale showing the operators console including the ground speed and header control members.

In FIG. 3, the display is shown in more detail as indicated at 40 and includes an LCD display area 40A and a plurality of individual indicator lights 40B. A switch 40C is one of a number of switches and is provided to actuate the control of the reel or header speed relative to the ground speed as described hereinafter. The speed control is shown at 38 and comprises a conventional lever moveable forward and rearward in a track 38B. The control 39 is mounted on the end of the lever 38A and includes a plurality of switches which control the header or implement. The manual control 39 includes a reel speed control switch 39A and a scroll switch 39B. The control 39 also includes a first four-way switch 39C which acts in one axis to raise/lower the reel by operation of the cylinders 25A and in the other axis to positions the reel fore/aft by operation of the cylinders 25B. The control 39 also includes a second four way switch 39D which acts in one axis to raise/lower the header by operation of the cylinders 18A and in the other axis to tilt the header forward/rearward by operation of the cylinder 18C.

In a first simplified arrangement of the control system, the arrangement described herein controls the speed of the reel relative to the ground speed as described hereinafter. In an alternative arrangement which is slightly the same construction, the speed of the reel can be tied to the speed of the converging system so that they are driven at the same speed which is then controlled relative to ground speed as described hereinafter. In this case the reel and the converging system may be driven by a common motor and connected by a mechanical linkage.

In other arrangements, the converging system may be driven at a constant speed regardless of the ground speed and this arrangement is commonly used in regard to auger type converging systems whereas draper systems generally require control of the draper speed relative to the ground speed.

In a more complex arrangement the system may provide independent control of the reel speed and the draper speed relative to ground speed as described hereinafter.

In this case, therefore, there is provided a separate system for controlling the draper speed which requires a separate switch from the reel speed switch.

Turning therefore to the single control arrangement, this includes the ground speed sensor 31 and the reel speed sensor 32. These provide input into the controller 43 which then acts to display these values to the operator in the operator's console at the display 40.

It will be appreciated that the operator has primary control over the ground speed which is controlled by the operator in dependence upon the crop conditions so that the operator maximizes the ground speed while accommodating the different crop conditions. Thus the ground speed controls the amount of crop which feeds into the system and also controls the proper handling of that crop as it is fed into the header.

The switch 40C can be operated by the operator from an on position in which the controller automatically controls the reel speed (or the header speed) relative to ground speed and an off position in which the reel speed is controlled manually by the operator.

In the arrangement described herein, the controller is arranged such that in the on position of the switch 40C the reel speed is controlled at a speed of the bats of the reel relative to the ground which is maintained at a predetermined difference or index relative to the ground speed. Thus in normal operating conditions, the reel bats move at a speed different from the ground speed by an index value. The index can be positive or negative so that in some cases the reel speed is less than ground speed. Thus the reel speed is maintained at a speed which is equal to the ground speed plus a predetermined index value which is maintained constant until changed by the operator.

When the switch 40C is in the on position, the reel speed control switch 39A can be operated by the operator to vary the index. Thus the index value can be decreased by pressing the toggle switch 39A to the left and the index value can be increased by pressing the toggle switch 39A to the right. When set, the index value is maintained constant until changed by the operator. The index value can vary for example between minus 2 and plus 3. The actual reel speed is therefore calculated by summing the ground speed, as it varies as controlled by the operator and the index value to provide an actual value of reel speed which is controlled by the controller 43 through the motor 29.

Thus the speed of the reel can be controlled by the single on off switch 40C together with the increase and decrease switch 39A.

In addition, in some cases it is desirable to set a minimum reel speed. Thus even if the ground speed falls to a very low value it is necessary that the reel speed is maintained above a minimum value even when the sum of the ground speed and the index value falls below that minimum speed. Thus the system allows the operator to set a minimum reel speed and the controller operates to maintain the reel speed at a value equal to the sum of the ground speed and the index value down to the minimum value and then to maintain the reel speed at that minimum value until the ground speed is increased again to a value such that the sum of the ground speed and the index value becomes greater than the minimum reel speed value.

The minimum reel speed value is set by actuating the scroll switch 39B so that the display scrolls through a number of different values. One of those values which can be scrolled is that of the minimum reel speed. When the minimum reel speed value is displayed on the display 40, operation of the switch 39A in the increase or decrease direction acts to control or vary the minimum reel speed value.

Yet further the controller is arranged such that, while in the automatic control mode, when the reel speed falls to the minimum speed, the display is automatically modified so as to display the minimum reel speed value. While the minimum speed value is displayed, manual operation of the switch 39A varies the minimum value.

The display 40 also includes a tone generator 40D which is provided to generate warning tones to the operator. The controller 43 is arranged such that, when the minimum reel speed value is being displayed and when the operator operates the switch 39A, in order to ensure that the operator is aware that operation of the switch 39A will vary the minimum value rather than the index value or the actual value of reel speed, a tone is emitted by the tone generator 40D to warn the operator that minimum reel speed value is being changed.

The controller is further arranged such that when the minimum reel speed value is displayed, the display is steady when minimum reel speed is less than ground speed and the display is flashing when the minimum reel speed is greater than ground speed.

The above systems are used to ensure that the operator is aware of exactly what is being modified and exactly what is the condition of the system when the switch 39A is operated.

In this way, the various parameters of operation of the reel speed can be controlled using simply the on/off switch 40C, the scroll switch 39B and the main manual increase/decrease switch 39A. This therefore simplifies the system to the operator so that the main operation of the increasing and decreasing action is effected by the single switch 39A.

As an optional arrangement, in addition to the control of the reel speed, separate control to the speed of the draper is provided. In this arrangement, a switch 40D, which is additional to the switch 39A, is provided so that this can be used in an exactly symmetrical manner to control the speed of the draper. The same arrangements are provided in symmetrical manner for the minimum draper speed so that this may be controlled independently of the minimum reel speed. in the embodiment shown, the switch 40D is located on the display 40 adjacent the switch 40C, but other locations may be selected The actual control of the motor 29 driving the reel and the motors 28 driving the drapers is effected using PWM techniques which are well known to one skilled in this art. Thus a momentary/off/momentary switch provides power to a PWM (pulse width modulator) to vary the oil flow in valves to control the speed of the reel and conveyor. The controller 43 that provides the "Index header speed" feature requires a speed signal from the sensor 32 for reel speed (and for conveyor if programmed or use a relative flow setting in combination with ground speed and works as follows:

Provide increased header speed (reel and conveyor speed) with increased ground speed and vice versa, when on/off switch is in the "on" position. In the "on" position, this now causes the "reel" and "conveyor" switches to affect the amount of index relative to ground speed instead of using a separate switch for index. When in the "on" position, an indicator light above the on/off switch will be illuminated.

On draper headers it is desirable that the draper speed be within +/−5 mph from ground speed. When in the "index" mode, the index for the draper will be limited to within this range.

In conjunction with the "index header speed" function, a minimum speed for the reel and conveyor will work as described hereinafter.

The monitors are initially set with minimum reel and conveyor speed set at 0.

To adjust the minimum speed setting, when the index header speed function is on, two additional selections will be available on the monitor displays, "MIN REEL SPD" and "MIN CONV SPD" (if it is programmed to index). The "MIN REEL SPD" will be the very first to pop up whenever the scroll button is hit and the "MIN CONV SPD" will be the second. If the scroll switch is pressed to proceed on to other functions, the reel and conveyor minimum speeds will reappear at the end of the scroll rotation. While in this mode the reel speed and conveyor speed switches will affect the setting of the minimum speeds. The top display will show "xxxx MIN REEL" where xxxx is the min reel speed setting. If the ground speed is below the minimum setting, the reel (or conveyor) speed will change with the minimum adjustment made if the header is engaged. If the ground speed is higher than the minimum reel speed, the reel speed will continue to be controlled by the index function but the display will show the adjusted minimum reel speed setting. If the header is not engaged the min reel speed can still be adjusted. The monitor will remain in this mode for 5 seconds after the last speed adjustment is made or until the scroll switch is pressed again, at which time it will revert to the previous selection.

Whenever during normal operation with index "on" the ground speed drops below the minimum reel speed the machine automatically goes into the "MIN REEL SPD" mode (without depressing the scroll switch) and behaves as outlined above. The display does not change, i.e. show reel/conveyor minimum speed unless it was already selected. If the reel speed switch is pressed under this condition a tone will sound to tell the operator that he is changing minimum speed (and not index) and only if the minimum speed becomes greater than ground speed will the 5 second lock-in period apply.

Whenever the minimum speed is displayed, it will be steady when less than ground speed and flashing when greater than ground speed. While in the process of adjusting the minimum speed, whenever the minimum speed crosses the point where minimum speed is equal to ground speed, a tone will sound.

So it can be seen that the control methodology of the reel does not change for the operator in any condition:

When index is off a switch on the ground speed lever simply controls the reel speed.

When index is on and reel speed is above minimum speed, the index is controlled by the same switch.

When index is on and reel speed is below minimum speed, the minimum speed setting is controlled by the same switch.

The implement control system 39 further includes an additional crop-lodged switch 39E which can be operated to send a control signal to the computer controller 43. Under some conditions crops get lodged badly making it difficult to effectively pick up the crop and cut it cleanly. With the push of the single button, which is the crop-lodged switch 39E the controller 43 is arranged do the following functions:

Operate the cylinders 25A to drop the reel to a pre-set minimum height,

Operate the cylinders 25B to extend the reel fore-aft to the maximum forward position.

Operate the cylinders 18A and 18B to lower the header height to a preset height, defined by the operator, for down crop where the reel tines just skim above the ground.

In this position, which is pre-set by the operator and can be immediately and simply engaged by the operator with the single button 39E, the down crop can be most efficiently lifted and cut. Thus this condition can be implemented immediately and without the necessity of the operator operating the individual control switches 39C and 39D for the reel and header locations.

An operator usually has more time to readjust settings when going from down crop to standing crop, so once back into standing crop the operator can use the three separate control switches to bring the header back to the right settings for standing crop. The wrong setting when getting into down crop usually only results in stripping. The down crop settings, if maintained after the down crop conditions have passed, usually do not result in an unacceptable level of missed crop so that the conventional individual switches can be used for transitioning back to the settings for the standing crop.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A swather comprising:
    a tractor having ground wheels and a drive system for transporting the tractor in a direction of operation across ground carrying a standing crop to be harvested;
    a header attached to the tractor so as to be moved thereby over the ground for harvesting the crop;
    the header having a cutting knife arranged to provide a cutting action across a width of the header for cutting the standing crop;
    the header having a reel mounted above the cutting knife for rotation about a reel axis generally parallel to the ground and at right angles to the direction of operation such that bats of the reel pass over the cutting knife to carry the crop rearwardly of the knife, the reel being driven by a reel drive system;

a convergence system rearwardly of the cutting knife for converging the cut crop into a swath for discharge from the header onto the ground;

a speed control manually operable by an operator of the tractor for controlling a ground speed of the tractor so as to control a forwarding speed of the cutting knife over the ground;

a header speed control system for controlling a speed of the reel;

a header lift actuator for raising and lowering the header relative to the tractor;

a reel lift actuator for raising and lowering the reel relative to the cutting knife;

a reel location actuator for locating the fore and aft position of the reel relative to the cutting knife;

and a header position control system for controlling the position of the header relative to the tractor and the reel relative to the header switch, the header position control system including:

a first manually operable control switch operable by the operator for manually controlling the header lift actuator so as to move the header to a required position set by the operator;

a second manually operable control switch operable by the operator for manually controlling the reel lift actuator so as to move the reel to a required height position set by the operator;

a third manually operable control switch operable by the operator for manually controlling the reel location actuator so as to move the reel to a required fore and aft position set by the operator;

and a crop-lodged switch operable by the operator;

the crop-lodged switch being arranged when operated by the operator in a single switch action to carry out at least each of the following three functions:

to actuate the header lift actuator to move the header, without the operator operating the first manually operable control switch, from the required position of the header to a predetermined lowered position in which the cutting knife is close to the ground;

to actuate the reel lift actuator to move the reel, without the operator operating the second manually operable control switch, from the required height position of the reel to a lowermost position of the reel;

and to actuate the reel location actuator to move the reel, without the operator operating the third manually operable control switch, from the required fore and aft position of the reel to a forward most position of the reel.

2. The swather according to claim 1 wherein the first, second and third switches and the crop-lodged switch are arranged such that the header and reel are returned to an operating position after operation of the crop-lodged switch by manual operation of the first, second and third switches.

* * * * *